United States Patent
Mann (10) Patent No.: US 7,386,308 B2
(45) Date of Patent: Jun. 10, 2008

(54) IN-BUILDING RADIO FREQUENCY COMMUNICATIONS SYSTEM WITH AUTOMATIC FAILOVER RECOVERY

(76) Inventor: Ernest Mann, 653 N. Creek Rd., Greenfield Center, NY (US) 12833

( * ) Notice: Subject to any disclaimer, the term of this patent is extended or adjusted under 35 U.S.C. 154(b) by 234 days.

(21) Appl. No.: 11/030,646

(22) Filed: Jan. 5, 2005

(65) Prior Publication Data

US 2006/0148468 A1    Jul. 6, 2006

(51) Int. Cl.
*H04Q 7/20* (2006.01)

(52) U.S. Cl. .................. 455/426.1; 455/13.3; 343/713

(58) Field of Classification Search ............ 455/426.1, 455/13.3, 19, 11.1, 9, 10, 66, 67.11, 277–279
See application file for complete search history.

(56) References Cited

U.S. PATENT DOCUMENTS

| | | | |
|---|---|---|---|
| 4,039,947 A * | 8/1977 | Miedema ........................ 455/8 |
| 5,634,193 A | 5/1997 | Ghisler |
| 5,832,365 A | 11/1998 | Chen et al. |
| 6,075,330 A * | 6/2000 | Terk ........................... 318/280 |
| 6,704,545 B1 | 3/2004 | Wala |
| 6,868,254 B2 * | 3/2005 | Weissman ................... 455/11.1 |
| 2001/0038670 A1 * | 11/2001 | Whight ........................ 375/267 |
| 2002/0028655 A1 * | 3/2002 | Rosener et al. ............... 455/16 |
| 2004/0110469 A1 * | 6/2004 | Judd et al. ..................... 455/15 |
| 2004/0176027 A1 * | 9/2004 | O'Neill .......................... 455/7 |
| 2005/0130589 A1 * | 6/2005 | Weissman ................... 455/11.1 |
| 2005/0176458 A1 * | 8/2005 | Shklarsky et al. ........... 455/523 |
| 2005/0254442 A1 * | 11/2005 | Proctor et al. .............. 370/294 |
| 2005/0286448 A1 * | 12/2005 | Proctor et al. .............. 370/279 |
| 2006/0014491 A1 * | 1/2006 | Cleveland .................... 455/17 |
| 2006/0040616 A1 * | 2/2006 | Wheatley ................. 455/67.11 |

FOREIGN PATENT DOCUMENTS

JP            9-284169       * 10/1997

* cited by examiner

*Primary Examiner*—George Eng
*Assistant Examiner*—Khawar Iqbal
(74) *Attorney, Agent, or Firm*—Anthony D. Pellegrini, Esq.

(57) ABSTRACT

An improved in-building radio frequency communications system with automatic failover recovery comprising a primary external antenna and at least one ancillary external antenna, each antenna directed to a primary transmission tower and to at least one ancillary transmission tower, respectively, and a diversity site donor system capable of monitoring the strength and/or quality of the radio frequency signals received from the primary transmission tower and switching communications between the primary transmission tower and the ancillary transmission tower(s) based on the strength and/or quality of the radio frequency signals received from the primary transmission tower.

8 Claims, 6 Drawing Sheets

IN-BUILDING RADIO FREQUENCY COMMUNICATIONS SYSTEM WITH AUTOMATIC FAILOVER RECOVERY

FIELD OF THE INVENTION

The invention relates to the field of in-building radio communication coverage enhancement. Specifically, the invention provides a solution to maintain radio communication coverage inside a facility when the primary radio transmission tower providing the radio communication signals to the in-building system fails or is taken out of operation for maintenance or service. The invention will detect that the signals from the primary transmission tower are not viable and automatically connect radio communication signals from an alternate transmission tower to the in-building system electronics and signal distribution system.

BACKGROUND OF THE INVENTION

Wireless communication devices, such as cell phones and two-way radios, are becoming ever more popular. Such devices typically receive and transmit radio frequency (RF) signals from and to remote RF signal transmission towers, such as cell towers. While RF signals are capable of penetrating solid objects, the strength and quality of those signals degrade as more barriers are present between the transmission tower and the wireless communication device. Signal degradation is especially acute within structures, such as office buildings or factories, which offer multiple barriers between the transmission tower and the wireless communication device.

In-building radio frequency communications systems have been developed to improve performance of wireless communication devices within structures. These systems typically use a strategically located and directed antenna, which typically is located on the exterior of the structure (roof or side wall), providing a communications link with a RF signal transmission tower. The directed antenna is focused at a specific RF signal transmission tower (primary RF signal donor site) in an effort to maximize desired signal levels from the donor site to the in-building system. In addition, the directed antenna will minimize the level of non-desired and interference producing signals that arrive at angles, relative to the direction that the external antenna is focused, outside the horizontal beamwidth of the external antenna. The desired effect of the directed antenna is to isolate the in-building system from all RF signals other than those used at the primary donor site. They also use one or more low profile antennas located within the interior of the structure, strategically placed to provide coverage in areas where the RF signal levels and/or quality are not adequate to support reliable transmissions. The internal antennas are linked together by an infrastructure comprised of coaxial fiber optic and/or network cables and power splitters. The infrastructure is typically connected with the external antenna through a bi-directional amplifier (BDA), a device that increases the strength of the signal passing through it, either as the signal is received from the transmission tower to be transmitted to the wireless communication device (the signal downlink) or as the signal is received from the wireless communication device to be transmitted to the transmission tower (the signal uplink). In such a system, the RF signals are 1) received from the transmission tower by the external antenna and connected to the BDA; 2) amplified by the BDA; 3) distributed via the system infra-structure to the internal antennas, whose quantity and location inside the facility are appropriate to meet system requirements; and 4) radiated at a sufficient level to support reliable radio communications. The net effect is to allow the signals to pass between the transmission tower and the external antenna and between the wireless communication device and the internal antennas with relatively few intervening barriers. This minimization of intervening barriers, together with the signal amplification provided by the BDA greatly improves in-building performance of wireless communication devices.

In-building radio frequency communications systems are well known in the prior art, and may be implemented in any number of ways. See, e.g., Point-To-Multipoint Digital Radio Frequency Transport, U.S. Pat. No. 6,704,545 (Wala), issued Mar. 9, 2004; Communication System Comprising An Active-Antenna Repeater, U.S. Pat. No. 5,832,365 (Chen, et al.), issued Nov. 3, 1998; Method Of Locating A Mobile Station In A Mobile Telephone, U.S. Pat. No. 5,634,193 (Ghisler), issued May 27, 1997. However, while these systems are designed to handle the communications within a building, they all depend on reliable signals from the radio frequency transmission tower to support in-building transmissions. Thus, in-building signal enhancement tends to be susceptible to failure if there is an interruption or degradation of service at the external radio frequency transmission tower. This may result from a mechanical failure, a planned maintenance shutdown, environmental factors such as a lightning strike, or other causes, most of which are beyond the control or even awareness of the end use of the wireless communications device. In-building radio frequency communications systems known in the prior art are unable to recover from such interruptions and thus fail to provide the level of quality and reliability desired by end users.

One class of in-building frequency communications system known in the art does exemplify some failure recovery properties. Where an omni-directional antenna is used as the external antenna for an in-building system, by design the omni-directional antenna sends and receives RF signals equally in the horizontal plane, compared to a directional antenna, which will focus RF energy from approximately 15° to 100° of the horizontal plane. When an omni-directional antenna is used as the external antenna for an in-building system, there may be some degree of radio frequency transmission site diversity due to the inherent ability of the omni-directional antenna to transmit/receive RF signals equally in the horizontal plane. Under this scenario, signals from more than one radio frequency transmission tower may be connected into the in-building system and if signals from one radio frequency transmission tower fail, signals from a different radio frequency tower may be available to provide a level of coverage inside the facility. However, this configuration does not allow for specific redirection for precise control over alternative RF signal sources. The present invention, by placing such control with the system designer, is an improvement over in-building systems that have been designed to provide radio frequency transmission tower diversity through the use of an omni-directional external antenna.

The present invention is directed to an in-building radio frequency communications system with the capability to automatically transfer RF signals to the in-building system from multiple radio frequency transmission towers. As such, it offers improved RF signal access reliability over known systems.

It is an object of this invention to provide a fault tolerant in-building radio frequency communications system which minimizes disruptions due to failure of the RF signals from the primary radio frequency transmission tower.

It is a further object of this invention to provide a donor site diversity system which continuously detects the strength and quality of RF signals from a primary radio frequency transmission tower in order to automatically switch an in-building radio frequency communications system to an ancillary radio frequency transmission tower whenever the strength and quality of RF signals from a primary radio frequency transmission tower fall below an acceptable threshold. Other objects of this invention will be apparent to those skilled in the art from the description and claims which follow.

SUMMARY

The present invention is directed to an in-building radio frequency communications system with fault tolerant capability when RF signals from the primary radio frequency transmission tower are compromised or fail. Specifically, the invention relates to an improved system which incorporates into an in-building radio frequency communications system a primary external antenna and at least one ancillary external antenna, with the primary external antenna oriented to receive and transmit RF signals from and to a primary transmission tower, and the ancillary external antenna oriented to receive and transmit RF signals from and to one (or more) ancillary transmission towers.

The present invention further integrates an RF signal detection and switching mechanism into the in-building radio frequency communications system, the said detection and switching mechanism having two functions: 1) the detection mechanism constantly monitors the strength and quality of the RF signals received from the primary transmission tower; and 2) whenever the strength and/or quality of those RF signals deteriorates below a certain threshold, the switching mechanism redirects communications for the in-building radio frequency communications system to the ancillary transmission tower. The redirection of communication signals is achieved by toggling a switch within the switching mechanism, resulting in the circuit between the in-building system and the primary external antenna being interrupted and the circuit between the in-building system and the ancillary external antenna being completed, thereby establishing communications with the ancillary transmission tower. When the switching mechanism detects sufficient signal quality and/or strength in the RF signals received from the primary transmission tower, the switch is toggled to complete the circuit between the in-building system and the primary external antenna and to interrupt the circuit between the in-building system and the ancillary external antenna, thereby re-establishing communications with the primary transmission tower.

The above-described improvements to in-building radio frequency communications systems increase the reliability of communications in the event of disruptions from the primary transmission tower. By automatically redirecting the RF signal to a different transmission tower having sufficient performance criteria, the invention minimizes communications interruptions to in-building users of the system, achieving high levels of overall fault tolerance in the system.

The invention also contemplates using any number of ancillary external antennas directed at a like number of ancillary transmission towers. The ancillary transmission towers are prioritized, and the RF signal strength/quality detection component of the invention is employed for each ancillary transmission tower, except for the ancillary transmission tower designated as lowest priority. Upon detecting a sufficient loss of signal strength or quality from the primary transmission tower, the switching mechanism toggles to each successive ancillary transmission tower in turn, by order of priority, based on the detected signal strength/quality, until one receiving a sufficient strength and quality signal is detected. The strength and quality of signals received from the various transmission towers may be continuously monitored, with the switching mechanism toggling to the highest priority transmission tower having sufficient signal strength and quality. This configuration works best in densely populated geographies having multiple transmission towers within range of the system.

Other features and advantages of the invention are described below.

DESCRIPTION OF THE INVENTION

Figure 1:
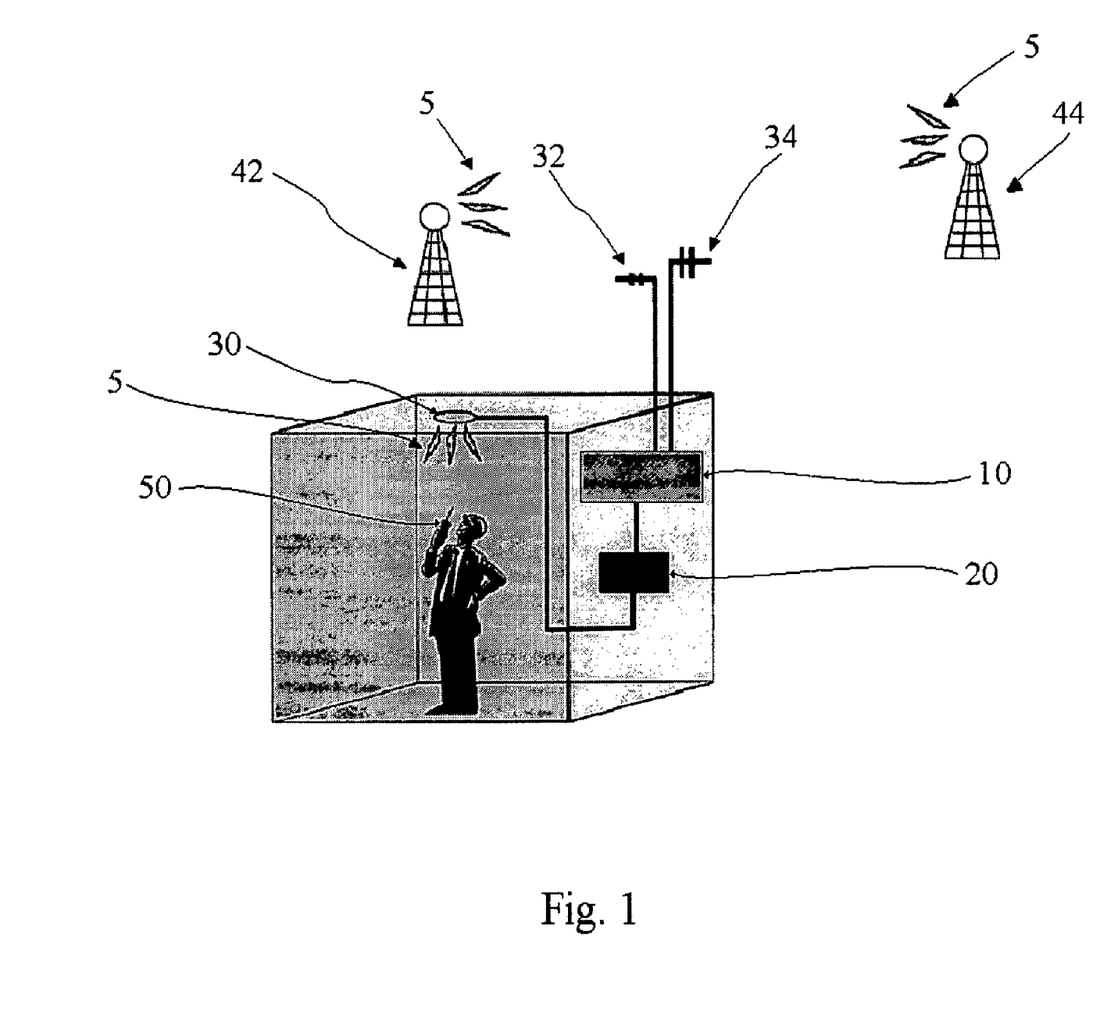
FIG. 1 is a schematic drawing depicting the basic components of the present invention, including a donor site diversity system.

The invention is an improvement on known in-building radio frequency communications systems designed to be installed and used within structures, such as office buildings, power generation plants, correctional facilities, etc. The basic in-building system is comprised of the following components: a primary external antenna 32, an ancillary external antenna 34, an internal antenna 30, a donor site diversity system 10, and a bi-directional amplifier 20. These components are networked together to form the in-building radio frequency communications system. In one embodiment, the donor site diversity system 10 is connected with the primary external antenna 32 and with the ancillary external antenna 34 by coaxial cables and/or fiber optic cables, and the bidirectional amplifier 20 is connected with the donor site diversity system 10 and with the internal antenna 30 by coaxial cables and/or fiber optic cables. This configuration is shown in FIG. 1.

The primary external antenna 32 must be configured to receive and transmit RF signals 5, which are used for communications with cell phones, two-way radios, and the like. The primary external antenna 32 typically should be located on the exterior of a structure where it can be directed to a primary RF signal transmission tower 42, such that the primary external antenna 32 is capable of transmitting and receiving RF signals 5 to and from the primary RF signal transmission tower 42. In the preferred embodiment, the primary external antenna 32 is located on the roof of the structure, or other location with an unobstructed path to the primary RF signal transmission tower 42. The primary RF signal transmission tower 42 is selected as providing the strongest and/or highest quality RF signal 5 available to connect with the in-building radio frequency communications system.

The ancillary external antenna 34 must also be configured to receive and transmit RF signals 5. The ancillary external antenna 34 typically should be located on the exterior of the structure where it can be directed to an ancillary RF signal transmission tower 44, such that the ancillary external antenna 34 is capable of transmitting and receiving RF signals 5 to and from the ancillary RF signal transmission tower 44. Because the ancillary external antenna 34 is directed to an ancillary RF signal transmission tower 44 generating RF signals 5 which when received are of a lower strength and/or quality than the RF signals 5 generated by the primary RF signal transmission tower 42, the ancillary external antenna 34 may be required to be of higher gain and greater directivity; for example, the ancillary external antenna 34 may be a parabolic grid-type antenna, whereas the primary external antenna 32 may be of lower gain and directivity, such as a corner reflector or yagi type antenna. Other types of higher gain and greater directivity antennas may also be used. Use of a higher gain and greater directivity ancillary external antenna 34 increases the likelihood that the RF signals 5 received from the ancillary RF signal transmission tower 44 and passed on to the bi-directional amplifier 20 will be of comparable strength and quality as those received from the primary RF signal transmission tower 42. In the preferred embodiment, the ancillary external antenna 34 is located on the roof of the structure. The ancillary RF signal transmission tower 44 is selected as providing the next strongest and/or highest quality RF signal 5 available to the in-building radio frequency communications system, after the primary RF signal transmission tower 42.

The internal antenna 30 must be configured to receive and transmit RF signals 5. The internal antenna 30 is typically a low-profile antenna with a power output significantly less than that of the primary 42 and secondary 44 radio transmission towers. The internal antenna(s) 30 typically is located within the interior of the structure where it is capable of transmitting and receiving RF signals 5 to and from wireless communication devices 50 located within the structure. In the preferred embodiment, multiple internal antennas 30 are located within the structure, with each internal antenna 30 configured to receive and transmit RF signals 5. The multiple internal antennas 30 are distributed throughout the interior of the structure so as to provide the greatest practical coverage within the structure, such that each of the internal antennas 30 is capable of transmitting and receiving RF signals 5 to and from nearby wireless communication devices 50. Each of the internal antennas 30 is connected with the bi-directional amplifier 20, either directly or indirectly via a network of cables. In the preferred embodiment, the network connecting the internal antennas 30 is comprised of coaxial cables, although other infrastructure configurations exist, such as fiber optic and network (CAT5/6) cable type systems.

The bi-directional amplifier 20 may be any type of RF signal amplifier known in the art capable of increasing the strength of RF signals 5. The bi-directional amplifier 20 must be capable of increasing the strength of RF signals 5 downlinked from RF signal transmission towers to be transmitted to personal communications devices, and capable of increasing the strength of RF signals 5 uplinked from wireless communication devices to be transmitted to RF signal transmission towers. The bi-directional amplifier 20 is connected with the donor site diversity system 10, from which it receives the downlinked RF signals 5 and to which it sends uplinked RF signals 5, and is connected with the internal antenna 30, from which it receives the uplinked RF signals 5 and to which it sends downlinked RF signals 5. In the preferred embodiment, the bi-directional amplifier 20 is located proximate to the donor site diversity system 10.

The donor site diversity system 10 is connected with the primary external antenna 32 and with the ancillary external antenna 34. The donor site diversity system 10 monitors the strength and quality of the RF signals 5 received by the primary external antenna 32 from the primary RF signal transmission tower 42. The donor site diversity system 10 is further capable of switching the communication connection between the primary RF signal transmission tower 42 and the ancillary RF signal transmission tower 44, based on the strength and quality of the RF signals 5 received from the primary RF signal transmission tower 42.

Figure 2:
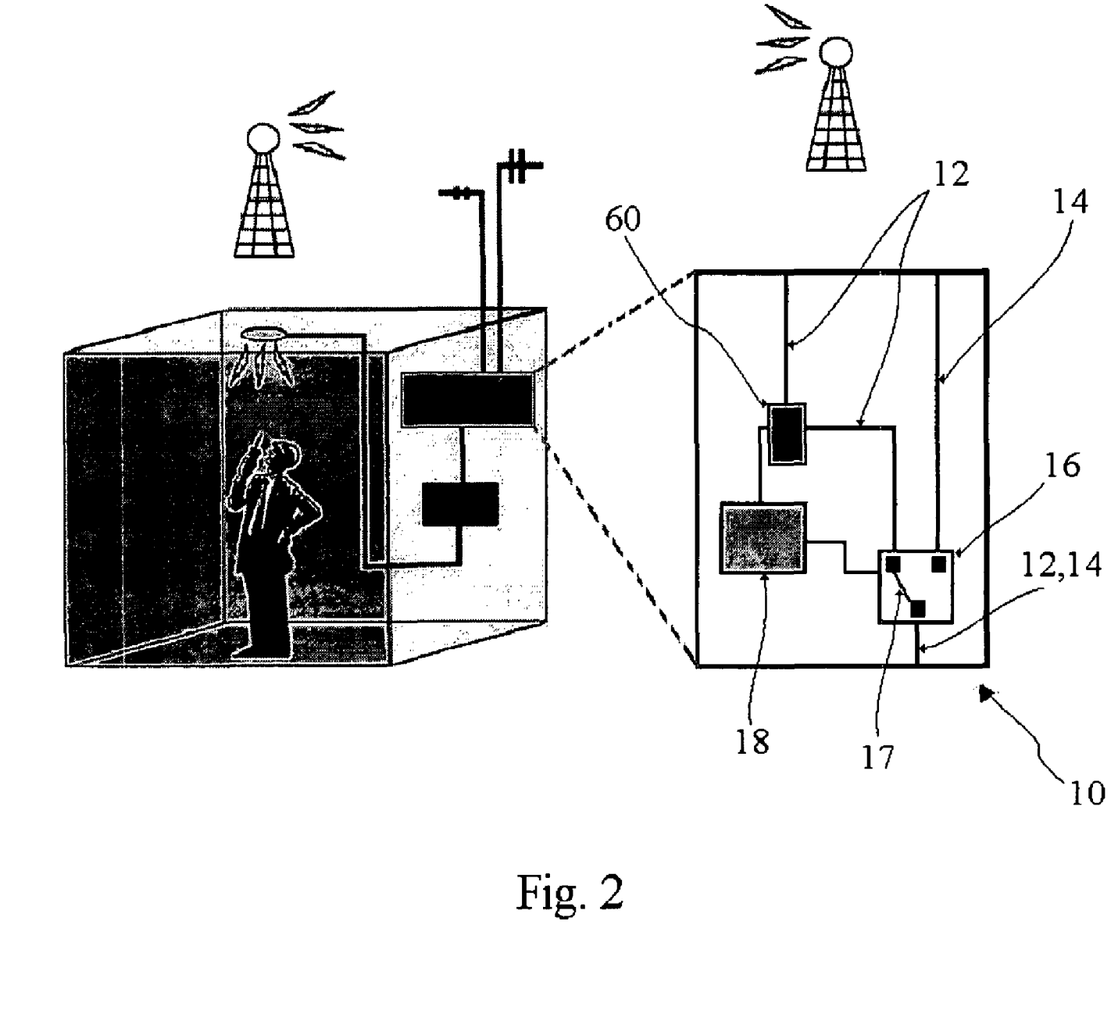
FIG. 2 is a schematic drawing depicting the basic components of the present invention, together with detail of the components comprising the donor site diversity system.

In one embodiment, the donor site diversity system 10 comprises a primary circuit 12, an ancillary circuit 14, a RF signal switch 16, and a RF signal detector/sensor 18. This configuration is shown in FIG. 2.

The primary circuit 12 is configured to establish a communications connection between the primary external antenna 32 and the bi-directional amplifier 20 such that RF signals 5 may travel between the primary external antenna 32 and the bi-directional amplifier 20. The ancillary circuit 14 is configured to establish a communications connection between the ancillary external antenna 34 and the bi-directional amplifier 20 such that RF signals 5 may travel between the ancillary external antenna 34 and the bi-directional amplifier 20. The primary circuit 12 and the ancillary circuit 14 are mutually exclusive; that is, when the primary circuit 12 is active, the ancillary circuit 14 is inactive, and RF signals 5 are received by and sent from the in-building radio frequency communications system solely through the primary circuit 12; and when the ancillary circuit 14 is active, the primary circuit 12 is inactive, and RF signals 5 are received by and sent from the in-building radio frequency communications system solely through the ancillary circuit 14.

The RF signal switch 16 is configured to activate and deactivate the primary circuit 12 and to activate and deactivate the ancillary circuit 14. In the preferred embodiment, the RF signal switch 16 toggles an interlink 17 between the primary circuit 12 and the ancillary circuit 14, such that the ancillary circuit 14 is interrupted when the interlink 17 is toggled to and completes the primary circuit 12, and the primary circuit 12 is interrupted when the interlink 17 is toggled to and completes the ancillary circuit 14.

Figure 4:
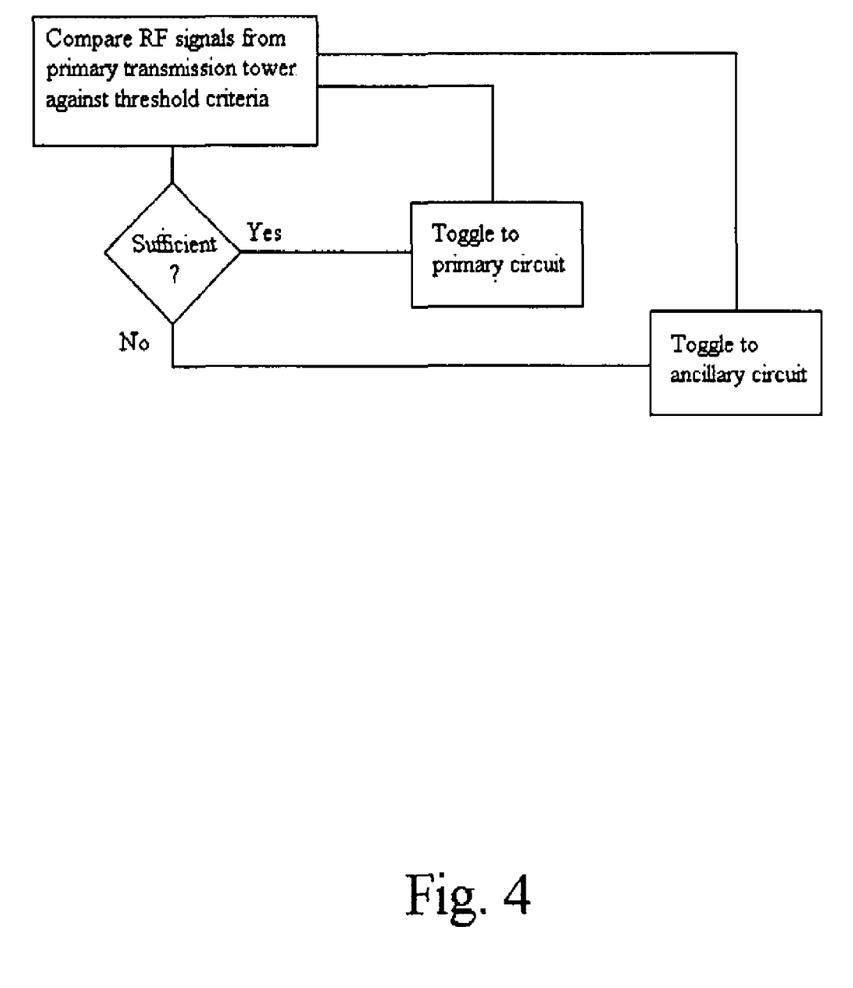
FIG. 4 is a flowchart showing the process for determining which RF signal transmission tower should be used when the in-building radio frequency communication system comprises a primary external antenna and a single ancillary external antenna.

The RF signal detector/sensor 18 is configured to monitor the strength and quality of the RF signals 5 received from the primary RF signal transmission tower 42. In one embodiment, the RF signal detector/sensor 18 comprises a monitoring means and a logic processor appropriate to the target RF signals 5 enhancing the in-building environment. The monitoring means is configured to monitor the strength and quality of the RF signals 5 received from the primary RF signal transmission tower 42. In the preferred embodiment, the monitoring means is configured to continuously monitor the strength and quality of the RF signals 5 received from the primary RF signal transmission tower 42. The logic processor of the RF signal detector/sensor 18 is connected with the RF signal switch 16, and is configured to determine the sufficiency of the strength and quality of the RF signals 5 received from the primary RF signal transmission tower 42. The threshold criteria for determining the sufficiency of the strength and quality of the RF signals 5 may be preset, or altered by the user, or dynamically altered automatically depending on environmental criteria. The logic processor compares the sufficiency of the strength and quality of the RF signals 5 against the threshold criteria, and communicates a positive signal to the RF signal switch 16 if the sufficiency of the strength and quality of the RF signals 5 meets or exceeds the threshold criteria, and communicates a negative or ground signal to the RF signal switch 16 if the sufficiency of the strength and quality of the RF signals 5 fails to meet or exceed the threshold criteria. The RF signal switch 16 in turn toggles the interlink 17 to complete the primary circuit 12 when a positive signal is received, thereby interrupting the ancillary circuit 14, and toggles the interlink 17 to complete the ancillary circuit 14 when a negative signal is received, thereby interrupting the primary circuit 12. This process is shown in FIG. 4.

Figure 2A:
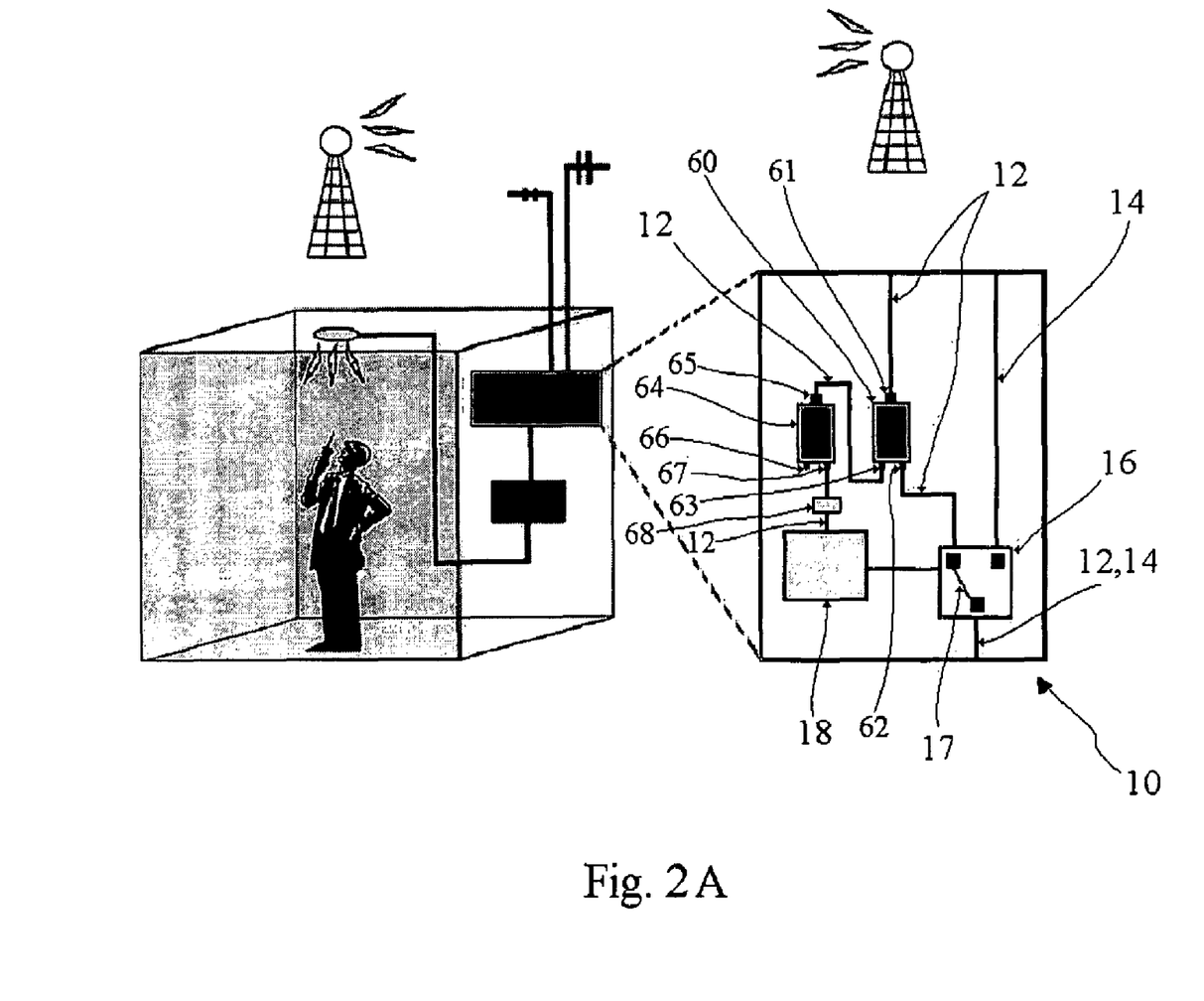
FIG. 2A is a schematic drawing depicting the basic components of the present invention, together with detail of the components comprising the signal splitting means of the donor site diversity system.

In one embodiment, the donor site diversity system 10 further comprises a signal splitting means for directing RF signals 5 to both the RF signal detector/sensor 18 and the RF signal switch 16. In the preferred embodiment the signal splitting means comprises an unequal power signal splitter 60, a two-way power divider 64, and a variable attenuator 68. The unequal power signal splitter 60 further has an input port 61, a high power output port 62, and a low power output port 63. The two-way power divider 64 further has an input port 65, a first equal power distribution output port 66, and a second equal power distribution output port 67. The unequal power signal splitter 60 is located in-line with the primary circuit 12, whereby the unequal power signal splitter 60 is in connection with the primary external antenna 32 through the input port 61 of the unequal power signal splitter 60, the unequal power signal splitter 60 is in connection with the RF signal switch 16 through the high power output port 62 of the unequal power signal splitter 60, and the unequal power signal splitter 60 is in connection with the two-way power divider 64 through the low power output port 63 of the unequal power signal splitter 60 and into the input port 65 of the two-way power divider 64. RF signals 5 from the primary external antenna 32 enter the unequal power signal splitter 60 through its input port 61 and are directed simultaneously to the RF signal switch 16 and the two-way power divider 64. The two-way power divider 64 in turn is in connection with a test port through the first equal power distribution output port 66 of the two-way power divider 64 and with the variable attenuator 68 through the second equal power distribution output port 67 of the two-way power divider 64. The variable attenuator 68 is in connection with the RF signal detector/sensor 18. The variable attenuator 68 is used to adjust the threshold level of the RF signal detector/sensor 18. RF signals received by the primary external antenna 32 are transmitted along the primary circuit 12 to the unequal power signal splitter 60, whereby the RF signals 5 are then split between the RF signal switch 16 and the RF signal detector/sensor 18 (the latter by way of the two-way power divider 64 and variable actuator 68). In using the combination of the unequal power signal splitter 60 and the two-way power divider 64 to send RF signals 5 to the RF signal switch 16 and the RF signal detector/sensor 18, the monitoring means of the donor site diversity system 10 can monitor the strength and/or quality of the RF signals 5 received from the primary RF signal transmission tower 42 on a continuous basis. The RF signal detector/sensor 18 then directs the RF signal switch 16 to toggle between the primary circuit 12 and the ancillary circuit 14 as appropriate.

Figure 3:
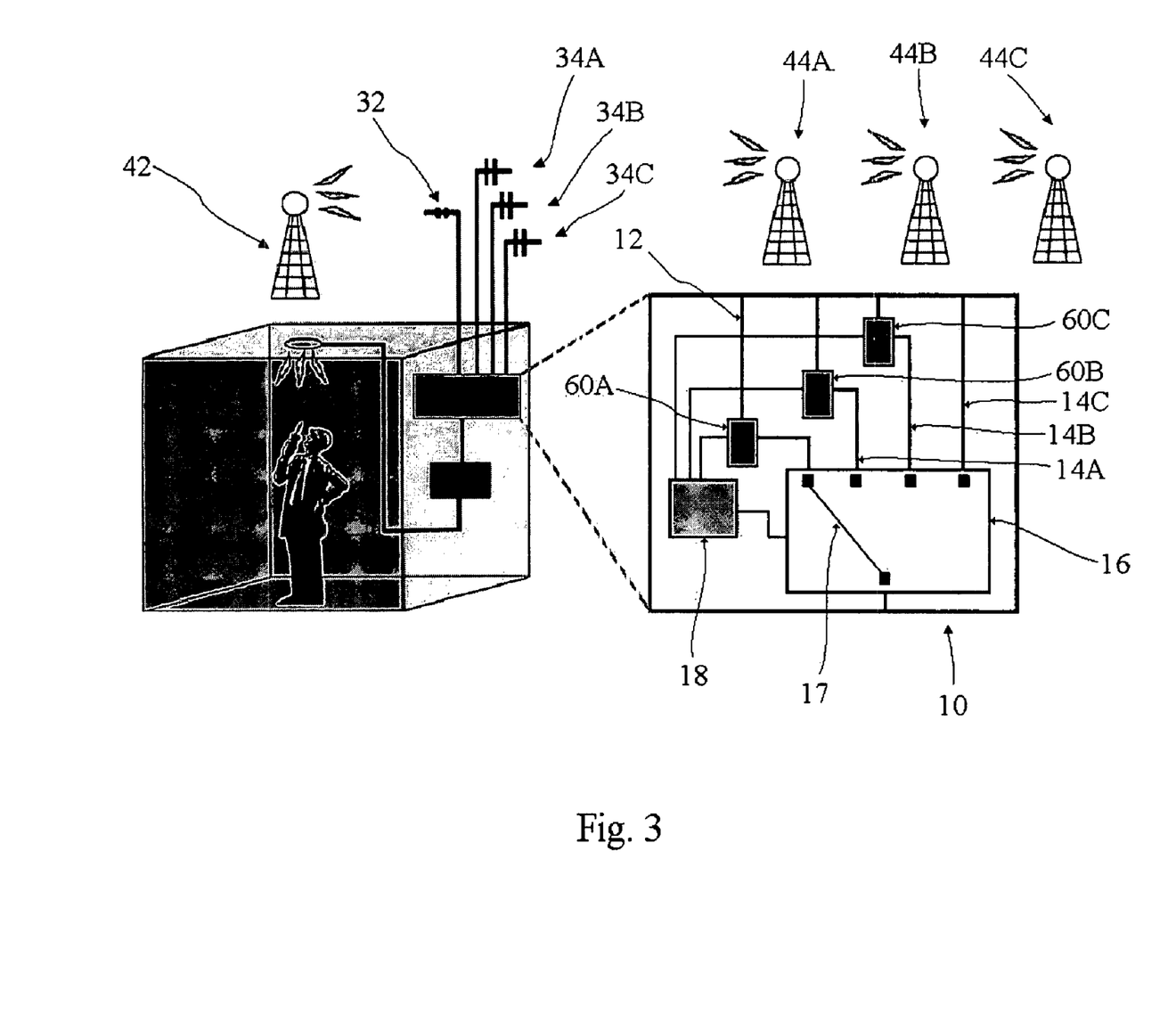
FIG. 3 is a schematic drawing depicting the basic components of the present invention, together with detail of the components comprising the donor site diversity system when multiple ancillary antennas are used.

In an alternate embodiment of the invention, the in-building radio frequency communications system comprises multiple ancillary external antennas 34. This configuration is shown in FIG. 3. Each of the ancillary external antennas 34 is configured to receive and transmit RF signals 5, and each of the ancillary external antennas 34 is located on the exterior of the structure, preferably on the roof, where it can be directed to a corresponding ancillary RF signal transmission tower 44, one ancillary RF signal transmission tower 44 per ancillary external antenna 34. Each ancillary external antenna 34 is capable of transmitting and receiving RF signals 5 to and from its corresponding ancillary RF signal transmission tower 44. As in the preferred embodiment, the ancillary external antennas 34 may be required to be of higher gain and greater directivity than the primary external antenna 32. For each of the ancillary external antennas 34, there is a corresponding ancillary circuit 14. Each such ancillary circuit 14 is configured to establish a connection between the corresponding ancillary external antenna 34 and the bi-directional amplifier 20, with one ancillary circuit 14 per ancillary external antenna 34, such that RF signals 5 may travel between each ancillary external antenna 34 and the bi-directional amplifier 20. Each of the ancillary RF signal transmission towers 44 is prioritized based on the strength and/or quality of the RF signals 5 received by the in-building radio frequency communications system under optimal conditions, with all ancillary RF signal transmission towers 44 having a lower priority than the primary RF signal transmission tower 42.

In this embodiment, the donor site diversity system 10 is connected with each of the multiple ancillary external antennas 34, in addition to the primary external antenna 32. As in the preferred embodiment, the RF signal detector/sensor 18 of the donor site diversity system 10 monitors the strength and quality of the RF signals 5 received by the primary external antenna 32 from the primary RF signal transmission tower 42. However, the RF signal detector/sensor 18 also monitors the strength and quality of the RF signals 5 received by each of the ancillary external antennas 34 from their corresponding ancillary RF signal transmission tower 44, except for the ancillary RF signal transmission tower 44 having the lowest priority, which is not monitored. The monitoring means may be configured to continuously monitor the strength and quality of the RF signals 5 received by each of the external antennas 32,34.

The logic processor of the RF signal detector/sensor 18 is configured to determine the sufficiency of the strength and quality of the RF signals received from each of the monitored radio frequency signal transmission towers 42,44, in conjunction with the priority established for each of the RF signal transmission towers 42, 44. The logic processor compares the sufficiency of the strength and quality of the RF signals 5 received from each monitored radio frequency transmission tower 42,44 against the threshold criteria, in order of priority, and for each such tower 42,44 communicates a positive signal to the RF signal switch 16 if the sufficiency of the strength and quality of the RF signals 5 meets or exceeds the threshold criteria, and communicates a negative or ground signal to the RF signal switch 16 if the sufficiency of the strength and quality of the RF signals 5 fails to meet or exceed the threshold criteria. The RF signal switch 16 in turn toggles the interlink 17 to complete the circuit 12,14 corresponding to the positive signal, thereby interrupting all other circuits. Once a positive signal is communicated by the logic processor to the RF signal switch 16, the process is reset and the logic processor repeats the process beginning with the primary RF signal transmission tower 42.

Figure 5:
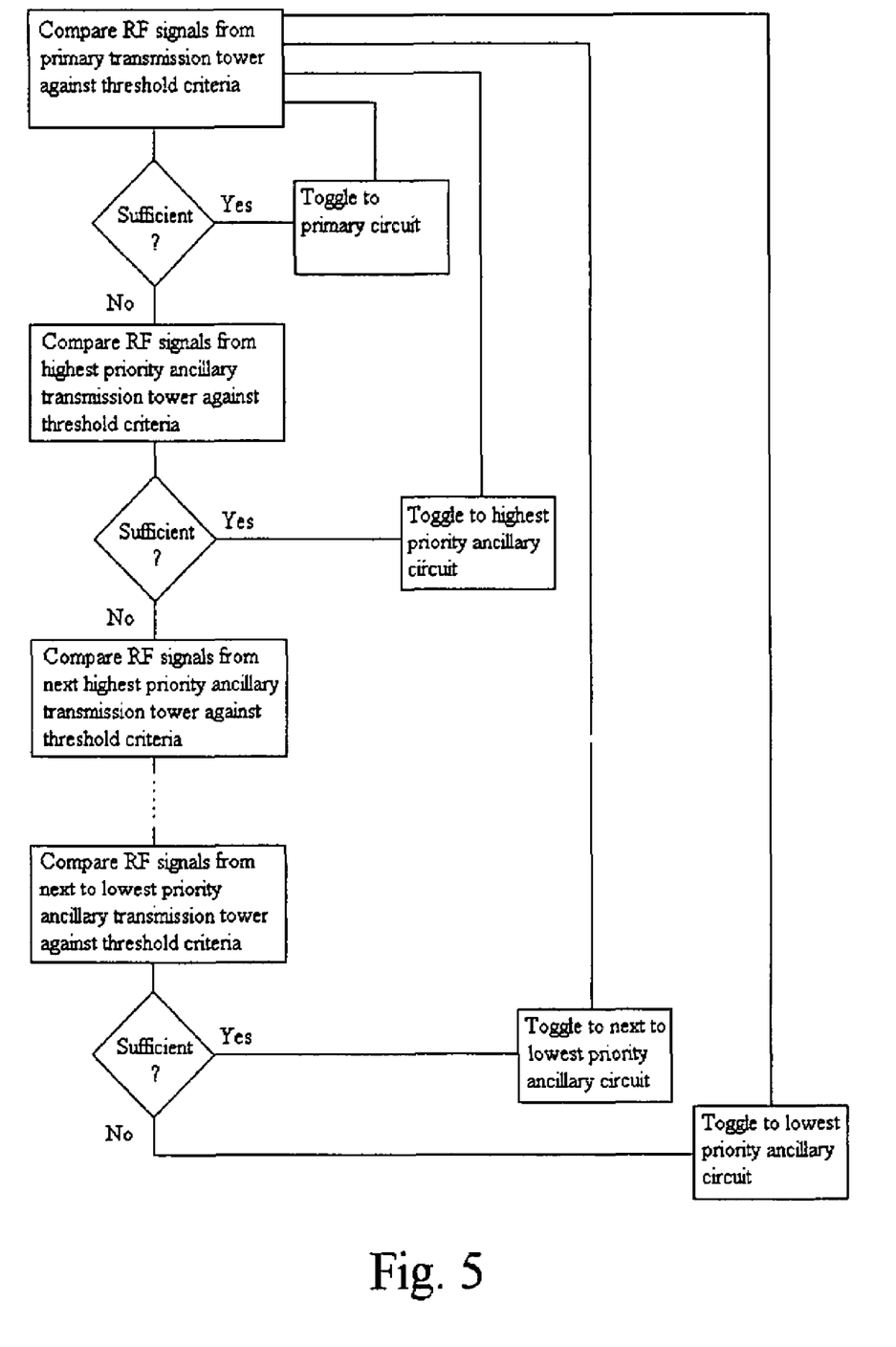
FIG. 5 is a flowchart showing the process for determining which RF signal transmission tower should be used when the in-building radio frequency communication system comprises a primary external antenna and multiple ancillary external antennas.

The determination of which RF signal transmission tower 42,44 is to be used for the communication connection by the donor site diversity system 10 in this embodiment is illustrated in FIG. 5. The logic processor of the RF signal detector/sensor 18 begins the process with an analysis of the RF signals 5 received from the primary RF signal transmission tower 42. When the strength and quality of the RF signals 5 received from the primary RF signal transmission tower 42 is sufficient, the donor site diversity system 10 switches the communications connection to the primary RF signal transmission tower 42, along the primary circuit 12, and all ancillary circuits 14 are disabled. The process then repeats. If, however, the strength and quality of the RF signals 5 received from the primary RF signal transmission tower 42 is insufficient, the donor site diversity system 10 determines whether the strength and quality of the RF signals 5 received from the ancillary RF signal transmission tower 44 having the highest priority is sufficient; if so, the donor site diversity system 10 switches the communications connection to that ancillary RF signal transmission tower 44, along its corresponding ancillary circuit 14, disabling the primary circuit 12 and all other ancillary circuits 14, and the process then repeats. If the strength and quality of the RF signals 5 received from the ancillary RF signal transmission tower 44 having the highest priority is insufficient, the strength and quality of the RF signals 5 received from the ancillary RF signal transmission tower 44 having the next highest priority is analyzed by the donor site diversity system 10, etc. If no monitored ancillary FR signal transmission tower 44 is transmitting RF signals 5 of sufficient strength and quality, the donor site diversity system 10 switches the communications connection to the ancillary RF signal transmission tower 44 having the lowest priority, along its corresponding ancillary circuit 14, disabling the primary circuit 12 and all other ancillary circuits 14.

This embodiment may also comprise multiple signal splitter means 60A, 60B. Each signal splitter means is configured as explained above. One signal splitter means 60A is located in-line with the primary circuit 12 between the primary external antenna 32 and the RF signal switch 16, and is in connection with the RF signal detector/sensor 18. Each of the monitored ancillary circuits 14 also is assigned a signal splitter means 60B, with one signal splitter means for each such ancillary circuit 14. Each such signal splitter means is located in-line with its ancillary circuit 14 between the corresponding ancillary external antenna 34 and the RF signal switch 16, and is in connection with the RF signal detector/sensor 18. RF signals 5 received by the primary external antenna 12 and by each monitored ancillary external antenna 14 are transmitted through the corresponding signal splitter means to both the RF signal switch 16 and the RF signal detector/sensor 18. In using the signal splitter means, the monitoring means of the donor site diversity system 10 can monitor the strength and/or quality of the RF signals 5 received from the RF signal transmission towers 42,44 on a continuous basis.

Modifications and variations can be made to the disclosed embodiments of the invention without departing from the subject or spirit of the invention as defined in the following claims.

I claim:

1. An in-building radio frequency communications system comprising:

a primary external antenna, suitably configured to receive and transmit radio frequency signals, said primary external antenna located on an exterior of a structure and oriented towards a primary radio frequency signal transmission tower such that the primary external antenna is capable of transmitting and receiving radio frequency signals to and from the primary radio frequency signal transmission tower;

an ancillary external antenna, suitably configured to receive and transmit radio frequency signals, said ancillary external antenna located on the exterior of the structure and oriented towards an ancillary radio frequency signal transmission tower such that the ancillary external antenna is capable of transmitting and receiving radio frequency signals to and from the ancillary radio frequency signal transmission tower;

a donor site diversity system, in connection with the primary external antenna and with the ancillary external antenna, said donor site diversity system suitably configured to monitor the strength and quality of the radio frequency signals received from the primary radio frequency signal transmission tower and capable of switching between the primary radio frequency signal transmission tower and the ancillary radio frequency signal transmission tower based on the strength and quality of the radio frequency signals received from the primary radio frequency signal transmission tower;

with the donor site diversity system comprising:

a primary circuit, suitably configured to establish a connection between the primary external antenna and the bi-directional amplifier such that radio frequency signals may travel between the primary external antenna and the bi-directional amplifier, an ancillary circuit, suitably configured to establish a connection between the ancillary external antenna and the bi-directional amplifier such that radio frequency signals may travel between the ancillary external antenna and the bi-directional amplifier, a radio frequency signal switch, suitably configured to complete or interrupt the primary circuit and to complete or interrupt the ancillary circuit, with the radio frequency signal switch having a means to toggle between the primary circuit and the ancillary circuit such that the ancillary circuit is interrupted when the radio frequency signal switch toggle means is toggled to and completes the primary circuit and the primary circuit is interrupted when the radio frequency signal switch toggle means is toggled to and completes the ancillary circuit, and a radio frequency signal detector/sensor, comprising:

a monitoring means, said monitoring means suitably configured to monitor the strength and quality of the radio frequency signals received from the primary radio frequency signal transmission tower, and a logic processor, suitably configured to determine the sufficiency of the strength and quality of the radio frequency signals received from the primary radio frequency signal transmission tower, said logic processor in connection with the radio frequency signal switch and further suitably configured to send a signal to the radio frequency signal switch directing the radio frequency signal switch toggle means to toggle between the primary circuit and the ancillary circuit based on the sufficiency of the strength and quality of the radio frequency signals received from the primary radio frequency signal transmission tower, whereby, when the radio frequency signals received from the primary radio frequency signal transmission tower are determined to be of sufficient strength and quality, the toggling means of the radio frequency signal switch is directed by the logic processor to complete the primary circuit and to interrupt the ancillary circuit, and when the radio frequency signals received from the primary radio frequency signal transmission tower are determined to be of insufficient strength and quality, the toggling means of the radio frequency signal switch is directed by the logic processor to complete the ancillary circuit and to interrupt the primary circuit;

an internal antenna, suitably configured to receive and transmit radio frequency signals, said internal antenna located within an interior of the structure such that the internal antenna is capable of transmitting and receiving radio frequency signals to and from one or more wireless communication devices located within the structure; and a bi-directional amplifier, in connection with the donor site diversity system and with the internal antenna, said bi-directional amplifier suitably configured to increase the strength of radio frequency signals received from the radio frequency signal transmission towers through the external antennas and received from the wireless communication devices through the internal antenna;

wherein the primary external antenna and the ancillary external antenna are suitably configured such that both the primary external antenna and the ancillary external antenna are capable of operating independently from the other, where at any given time only one of said primary and ancillary external antennas is receiving or transmitting radio frequency signals for purpose of providing a communications link between one of the radio frequency signal transmission towers and the one or more wireless communication devices, while the other of said primary and ancillary external antennas is in stand-by mode whereby it is not providing a communications link between either of the radio frequency signal transmission towers and the one or more wireless communication devices.

2. The in-building radio frequency communications system of claim 1 further comprising multiple internal antennas, each internal antenna suitably configured to receive and multiple internal antennas, each internal antenna suitably configured to receive and transmit radio frequency signals, with the multiple internal antennas distributed throughout the interior of the structure, such that each of the internal antennas is capable of transmitting and receiving radio frequency signals to and from wireless communication devices located within the structure, and with each of the internal antennas in connection with the bi-directional amplifier;

wherein the multiple internal antennas are suitably configured such that each of the multiple internal antennas is capable of operating independently from each other of the multiple internal antennas for the purpose of providing a communications link between one of the radio frequency signal transmission towers and the one or more wireless communication devices.

3. The in-building radio frequency communications system of claim 1 wherein the monitoring means of the radio frequency signal detector/sensor is suitably configured to continuously monitor the strength and quality of the radio frequency signals received from the primary radio frequency signal transmission tower.

4. The in-building radio frequency communications system of claim 1 wherein the donor site diversity system further comprises an unequal power signal splitter having an input port, a high power output port, and a low power output port;

a two-way power divider having an input port, a first equal power distribution output port, and a second equal power distribution output port; and a variable attenuator;

with the unequal power signal splitter located in-line with the primary circuit, whereby the unequal power signal splitter is in connection with the primary external antenna through the input port of the unequal power signal splitter, the unequal power signal splitter is in connection with the radio frequency signal switch through the high power output port of the unequal power signal splitter, the unequal power signal splitter is in connection with the two-way power divider through the low power output port of the unequal power signal splitter and the input port of the two-way power divider, the two-way power divider is in connection with a test port through the first equal power distribution output port of the two-way power divider, the two-way power divider is in connection with the variable attenuator through the second equal power distribution output port of the two-way power divider, and the variable attenuator is in connection with the radio frequency signal detector/sensor, such that radio frequency signals received by the primary external antenna are transmitted through the unequal power signal splitter and two-way power divider to both the radio frequency signal switch and the radio frequency signal detector/sensor.

5. The in-building radio frequency communications system of claim 1 further comprising multiple ancillary external antennas, each said ancillary external antenna suitably configured to receive and transmit radio frequency signals, each said ancillary external antenna located on the exterior of the structure and oriented towards a corresponding ancillary radio frequency signal transmission tower, and each said ancillary external antenna oriented to a different ancillary radio frequency signal transmission tower, such that each said ancillary external antenna is capable of transmitting and receiving radio frequency signals to and from the corresponding ancillary radio frequency signal transmission tower; and wherein the donor site diversity system further comprises connections with each of the multiple ancillary external antennas, said donor site diversity system capable of switching between the primary radio frequency signal transmission tower and each of the multiple ancillary radio frequency signal transmission towers, with the primary external antenna and each of the multiple ancillary external antennas being suitably configured such that the primary external antenna and each of the multiple ancillary external antenna are capable of operating independently from all of the others, where at any given time only one of said primary external antenna and the multiple ancillary external antennas is receiving or transmitting radio frequency signals for the purpose of providing a communications link between one of the radio frequency signal transmission towers and the one or snore wireless communication devices, while all the others of said primary external antenna and multiple ancillary external antennas are in stand-by mode whereby they are not providing a communications link between any of the radio frequency signal transmission towers and the one or snore wireless communication devices.

6. The in-building radio frequency communications system of claim 5 wherein the donor site diversity system further comprises:

multiple additional ancillary circuits, each said ancillary circuit suitably configured to establish a connection between a corresponding ancillary external antenna and the bi-directional amplifier, one said ancillary circuit per ancillary external antenna, such that radio frequency signals may travel between each ancillary external antenna and the bidirectional amplifier;

a radio frequency signal switch, suitably configured to complete or interrupt the primary circuit and to complete or interrupt each of the ancillary circuits, with the radio frequency signal switch capable of toggling between the primary circuit and each of the ancillary circuits, such that each of the ancillary circuits is interrupted when the radio frequency signal switch is toggled to and completes the primary circuit, and for each of the ancillary circuits, the primary circuit and all other ancillary circuits are interrupted when the radio frequency signal switch is toggled to and completes that ancillary circuit; and a radio frequency signal detector/sensor, comprising:

a monitoring means, said monitoring means suitably configured to monitor the strength and quality of the radio frequency signals received from the primary radio frequency signal transmission tower and all but one of the ancillary radio frequency signal transmission towers, and a logic processor, suitably configured to determine the sufficiency of the strength and quality of the radio frequency signals received from each of the monitored radio frequency signal transmission towers, and further configured to prioritize between the monitored radio frequency signal transmission towers, said logic processor in connection with the radio frequency signal switch and further suitably configured to send a signal to the radio frequency signal switch directing the radio frequency signal switch toggle means to toggle between the primary circuit and each of the ancillary circuits, based on the sufficiency of the strength and quality of the radio frequency signals received from the monitored radio frequency signal transmission towers and the priority of the monitored radio frequency signal transmission towers, whereby, when the radio frequency signals received from the primary radio frequency signal transmission tower are determined to be of sufficient strength and quality, the toggling means of the radio frequency signal switch is directed by the logic processor to complete the primary circuit and to interrupt all ancillary circuits, and when the radio frequency signals received from the primary radio frequency signal transmission tower are determined to be of insufficient strength and quality, the toggling means of the radio frequency signal switch is directed by the logic processor to complete the ancillary circuit corresponding to the ancillary radio frequency transmission tower having the highest priority and transmitting radio frequency signals of sufficient strength and quality, and to interrupt the primary circuit and all other ancillary circuits.

7. The in-building radio frequency communications system of claim 6 wherein the monitoring means of the radio frequency signal detector/sensor is suitably configured to continuously monitor the strength and quality of the radio frequency signals received from the monitored radio frequency signal transmission towers.

8. The in-building radio frequency communications system of claim 6 wherein the donor site diversity system further comprises multiple signal splitter means, with one said signal splitter means having an unequal power signal splitter having an input port, a high power output port, and a low power output port;

a two-way power divider having an input port, a first equal power distribution output port, and a second equal power distribution output port; and a variable attenuator;

with the unequal power signal splitter located in-line with the primary circuit, whereby the unequal power signal splitter is in connection with the primary external antenna through the input port of the unequal power signal splitter, the unequal power signal splitter is in connection with the radio frequency signal switch through the high power output port of the unequal power signal splitter, the unequal power signal splitter is in connection with the two-way power divider through the low power output port of the unequal power signal splitter and the input port of the two-way power divider, the two-way power divider is in connection with a test port through the first equal power distribution output port of the two-way power divider, the two-way power divider is in connection with the variable attenuator through the second equal power distribution output port of the two-way power divider, and the variable attenuator is in connection with the radio frequency signal detector/sensor, such that radio frequency signals received by the primary external antenna are transmitted through the unequal power signal splitter and two-way power divider to both the radio frequency signal switch and the radio frequency signal detector/sensor, and for each of the monitored ancillary external antennas, a different said signal splitter means, each having a corresponding unequal power signal splitter having an input port, a high power output port, and a low power output port;

a corresponding two-way power divider having an input port, a first equal power distribution output port, and a second equal power distribution output port; and a corresponding variable attenuator;

with the corresponding unequal power signal splitter located in-line with the ancillary circuit corresponding to that ancillary antenna, whereby the corresponding unequal power signal splitter is in connection with that ancillary external antenna through the input port of the corresponding unequal power signal splitter, the corresponding unequal power signal splitter is in connection with the radio frequency signal switch through the high power output port of the corresponding unequal power signal splitter, the corresponding unequal power signal splitter is in connection with the corresponding two-way power divider through the low power output port of the corresponding unequal power signal splitter and the input port of the corresponding two-way power divider, the corresponding two-way power divider is in connection with a corresponding test port through the first equal power distribution output port of the corresponding two-way power divider, the corresponding two-way power divider is in connection with the corresponding variable attenuator through the second equal power distribution output port of the corresponding two-way power divider, and the corresponding variable attenuator is in connection with the radio frequency signal detector/sensor, such that radio frequency signals received by that ancillary external antenna are transmitted through the corresponding unequal power signal splitter and corresponding two-way power divider to both the radio frequency signal switch and the radio frequency signal detector/sensor.

* * * * *